United States Patent
Kim (10) Patent No.: US 12,548,571 B2
(45) Date of Patent: Feb. 10, 2026

(54) DISPLAY DEVICE AND OPERATION METHOD THEREOF

(71) Applicant: LG ELECTRONICS INC., Seoul (KR)

(72) Inventor: Taejoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 18/557,260

(22) PCT Filed: May 31, 2021

(86) PCT No.: PCT/KR2021/006725
§ 371 (c)(1),
(2) Date: Oct. 25, 2023

(87) PCT Pub. No.: WO2022/255502
PCT Pub. Date: Dec. 8, 2022

(65) Prior Publication Data
US 2024/0203419 A1  Jun. 20, 2024

(51) Int. Cl.
*G10L 15/26* (2006.01)
*G06F 40/279* (2020.01)

(52) U.S. Cl.
CPC ............ *G10L 15/26* (2013.01); *G06F 40/279* (2020.01)

(58) Field of Classification Search
None
See application file for complete search history.

(56) References Cited

U.S. PATENT DOCUMENTS

| | | | |
|---|---|---|---|
| 9,058,309 B2 * | 6/2015 | Tanaka | G06F 40/103 |
| 9,665,250 B2 * | 5/2017 | Bos | G06F 3/04842 |
| 2002/0167545 A1 | 11/2002 | Kang et al. | |
| 2003/0158736 A1 | 8/2003 | James et al. | |
| 2004/0070573 A1 * | 4/2004 | Graham | G06V 10/987 345/179 |
| 2005/0140653 A1 * | 6/2005 | Pletikosa | G06F 3/0213 345/168 |
| 2006/0039606 A1 * | 2/2006 | Miyatake | G06V 30/127 382/189 |

(Continued)

FOREIGN PATENT DOCUMENTS

| | | |
|---|---|---|
| JP | 2021-082857 | 5/2021 |
| KR | 10-2002-0083268 | 11/2002 |

(Continued)

OTHER PUBLICATIONS

PCT International Application No. PCT/KR2021/006725, International Search Report dated Feb. 18, 2022, 4 pages.

(Continued)

*Primary Examiner* — Neeraj Sharma
(74) *Attorney, Agent, or Firm* — LEE, HONG, DEGERMAN, KANG & WAIMEY (57) ABSTRACT

A display device, according to one embodiment of the present disclosure, comprises: a display for displaying at least one input field; a speech acquisition unit for acquiring speech inputted in the input field; and a control unit for converting the speech to text, wherein the control unit may convert the speech to text by character unit or by phrase unit according to the type of the input field.

9 Claims, 7 Drawing Sheets

(56) References Cited

U.S. PATENT DOCUMENTS

| | | | |
|---|---|---|---|
| 2007/0300306 A1* | 12/2007 | Hussain | G06F 21/6227 |
| | | | 726/27 |
| 2008/0040099 A1 | 2/2008 | Wu et al. | |
| 2008/0072143 A1* | 3/2008 | Assadollahi | G06F 3/0236 |
| | | | 715/261 |
| 2008/0140307 A1* | 6/2008 | Chen | G06F 3/04886 |
| | | | 701/532 |
| 2012/0063684 A1* | 3/2012 | Denoue | G06V 30/412 |
| | | | 382/175 |
| 2012/0246573 A1* | 9/2012 | Arokiaswamy | G06F 40/166 |
| | | | 715/748 |
| 2014/0258827 A1* | 9/2014 | Gormish | G06F 40/174 |
| | | | 715/224 |
| 2015/0133197 A1 | 5/2015 | Kwak et al. | |
| 2018/0081622 A1 | 3/2018 | Taki et al. | |
| 2021/0043201 A1 | 2/2021 | Lee et al. | |
| 2023/0359812 A1* | 11/2023 | Cohen | G10L 17/02 |

FOREIGN PATENT DOCUMENTS

| | | |
|---|---|---|
| KR | 10-2014-0125964 | 10/2014 |
| KR | 10-2015-0053339 | 5/2015 |
| KR | 10-2015-0103615 | 9/2015 |
| KR | 10-2017-0055833 | 5/2017 |
| KR | 10-2019-0099358 | 8/2019 |

OTHER PUBLICATIONS

European Patent Office Application Serial No. 21944257.1, Search Report dated Jan. 14, 2025, 8 pages.

\* cited by examiner

DISPLAY DEVICE AND OPERATION METHOD THEREOF

CROSS-REFERENCE TO RELATED APPLICATION(S)

This application is the National Stage filing under 35 U.S.C. 371 of International Application No. PCT/KR2021/006725, filed on May 31, 2021, the contents of which is hereby incorporated by reference herein in its entirety.

TECHNICAL FIELD

The present disclosure relates to a display device and a method of operating thereof, and more specifically, to convert voice input into an input field into text.

BACKGROUND ART

Recently, digital TV service using wired or wireless communication network has become popular. Digital TV service may provide a variety of service that cannot be provided by existing analog broadcasting service.

For example, IPTV (Internet Protocol Television), a type of digital TV service, and smart TV service provide interactivity that allows user to actively select the type of program to watch and the viewing time. IPTV and smart TV services may provide various additional services, such as Internet search, home shopping, and online games, based on this interactivity.

In this way, when the display device provides function such as Internet search, home shopping, and online games, it may display an input field for logging in and an input field for search. The display device cannot only receive text to be input into these input field using button provided on the remote control, but may also receive input by recognizing the user's voice. However, since the display device converts the recognized user's voice into words on a word by word, there is a problem that errors occur when non-linguistic character string such as ID is converted into specific word. "For example, when a user intends to input 'icadot' as their ID, but since the display device converts the voice-recognized 'icadat' on a word by word, there is a problem that input ID is converted into unintended characters such as 'I see AT&T' or 'I can do it'."

DISCLOSURE

Technical Problem

The present disclosure seeks to minimize error that occur when converting the user's voice into text when receiving input to an input field as the user's voice.

The present disclosure seeks to increase the accuracy of speech-to-text conversion when the input to the input field is input by the user's voice.

Technical Solution

The present disclosure seeks to apply a method of converting a user's voice into text differently according to the type of input field.

A display device according to an embodiment of the present disclosure may comprise: a display configured to display at least one input field, a voice acquisition unit configured to acquire a voice input to the input field, and a control unit configured to convert the voice into text, wherein the control unit is further configured to convert the voice into text on a character unit or word unit according to a type of the input field.

wherein the control unit may convert the voice into character unit if the input field is a field that receives an ID, email address, or password, and convert the voice into word unit if the input field is a field that receives a search word.

wherein the control unit may obtain an attribute of the input field, and obtain the type of the input field based on the obtained attribute.

wherein the control unit may display the converted text in the input field without spacing, if the type of the input field is the first type.

wherein the control unit may, if the type of the input field is the first type, when a word meaning a space is recognized, display the converted text as the recognized word in the input field.

wherein the control unit may display the converted text in the input field using only alphabet, number, and preset special character if the type of the input field is the first type.

wherein the control unit may display the converted text to a language set as default in the input field if the type of the input field is the second type.

wherein the control unit may convert the voice into the character unit through an input mode switching function if the type of input field is the second type.

wherein the control unit may display an icon for switching the input mode if the type of the input field is the second type.

An operating method of a display device according to an embodiment of the present disclosure may comprise displaying at least one input field, obtaining a voice input to the input field; and converting the voice into text, wherein the step of converting the voice into text may comprise: obtaining a type of the input field, and converting the voice into the text on a character unit or a word unit according to the type of the input field.

Advantageous Effects

According to an embodiment of the present disclosure, since the voice is converted into letter or word unit according to the input field, speech-to-text conversion is performed according to the user's intention, and the accuracy of speech-to-text conversion is improved.

According to the embodiment of the present disclosure, there is an advantage in improving the limitation of voice input only when inputting existing search word, etc. In other words, there is an advantage in that voice input is possible even when entering an ID, password, or email address.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Figure 1:
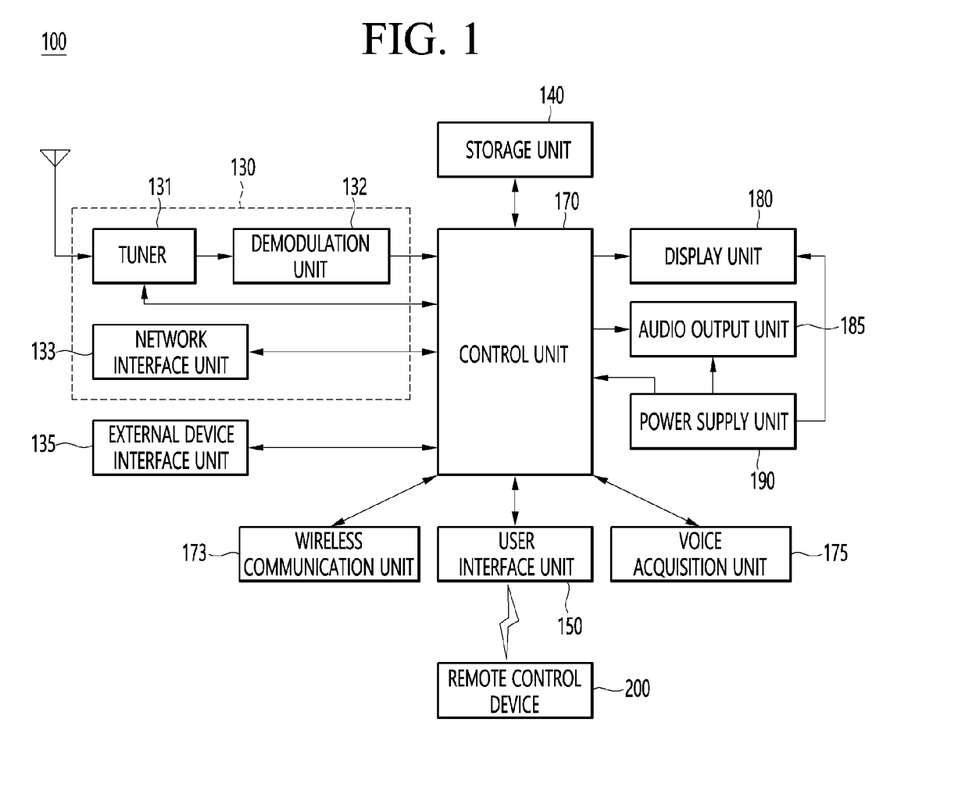
FIG. 1 is a block diagram illustrating a configuration of a display device according to an embodiment of the present disclosure.

FIG. 1 is a block diagram illustrating a configuration of a display device according to an embodiment of the present invention.

Referring to FIG. 1, a display device 100 may include a broadcast reception unit 130, an external device interface unit 135, a storage unit 140, a user interface unit 150, a control unit 170, a wireless communication unit 173, voice acquisition unit 175, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an Internet or content provider or a network operator.

The network interface unit 133 may select and receive a desired application among applications open to the air, through network.

The external device interface unit 135 may receive an application or an application list in an adjacent external device and deliver it to the control unit 170 or the storage unit 140.

The external device interface unit 135 may provide a connection path between the display device 100 and an external device. The external device interface unit 135 may receive at least one an image or audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system, but this is just exemplary.

Additionally, some of the content data stored in the display device 100 may be transmitted to a selected user or selected electronic device among other users or other electronic devices pre-registered in the display device 100.

The storage unit 140 may store signal-processed image, voice, or data signals stored by a program in order for each signal processing and control in the control unit 170.

Additionally, the storage unit 140 may perform a function for temporarily storing image, voice, or data signals output from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (for example, video files, still image files, music files, document files, application files, and so on) stored in the storage unit 140 and provide them to a user.

The user interface unit 150 may deliver signals input by a user to the control unit 170 or deliver signals from the control unit 170 to a user. For example, the user interface unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 may deliver, to the control unit 170, control signals input from local keys (not shown) such as a power key, a channel key, a volume key, and a setting key.

Image signals that are image-processed in the control unit 170 may be input to the display unit 180 and displayed as an image corresponding to corresponding image signals. Additionally, image signals that are image-processed in the control unit 170 may be input to an external output device through the external device interface unit 135.

Voice signals processed in the control unit 170 may be output to the audio output unit 185. Additionally, voice signals processed in the control unit 170 may be input to an external output device through the external device interface unit 135.

Besides that, the control unit 170 may control overall operations in the display device 100.

Additionally, the control unit 170 may control the display device 100 by a user command or internal program input through the user interface unit 150 and download a desired application or application list into the display device 100 in access to network.

The control unit 170 may output channel information selected by a user together with processed image or voice signals through the display unit 180 or the audio output unit 185.

Additionally, according to an external device image playback command received through the user interface unit 150, the control unit 170 may output image signals or voice signals of an external device such as a camera or a camcorder, which are input through the external device interface unit 135, through the display unit 180 or the audio output unit 185.

Moreover, the control unit 170 may control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform a wired or wireless communication with an external electronic device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The voice acquisition unit 175 may acquire audio. The voice acquisition unit 175 may include at least one microphone (not shown) and acquire audio of adjacent of display device 100 through a microphone (not shown)

The display unit 180 may convert image signal, data signal, or on-screen display (OSD) signal, which are processed in the control unit 170, or images signal or data signal, which are received in the external device interface unit 135, into R, G, and B signals to generate driving signal.

Furthermore, the display device 100 shown in FIG. 1 is just one embodiment of the present invention and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present invention and its specific operation or device does not limit the scope of the present invention.

According to another embodiment of the present invention, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present invention described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 and outputs it as audio.

The power supply unit 190 supplies the corresponding power throughout the display device 100. In particular, power may be supplied to the control unit 170, which can be implemented in the form of a system on chip (SOC), the display unit 180 for displaying images, and the audio output unit 185 for audio output.

Specifically, the power supply unit 190 may include a converter that converts alternating current power to direct current power and a dc/dc converter that converts the level of direct current power.

Figure 2:
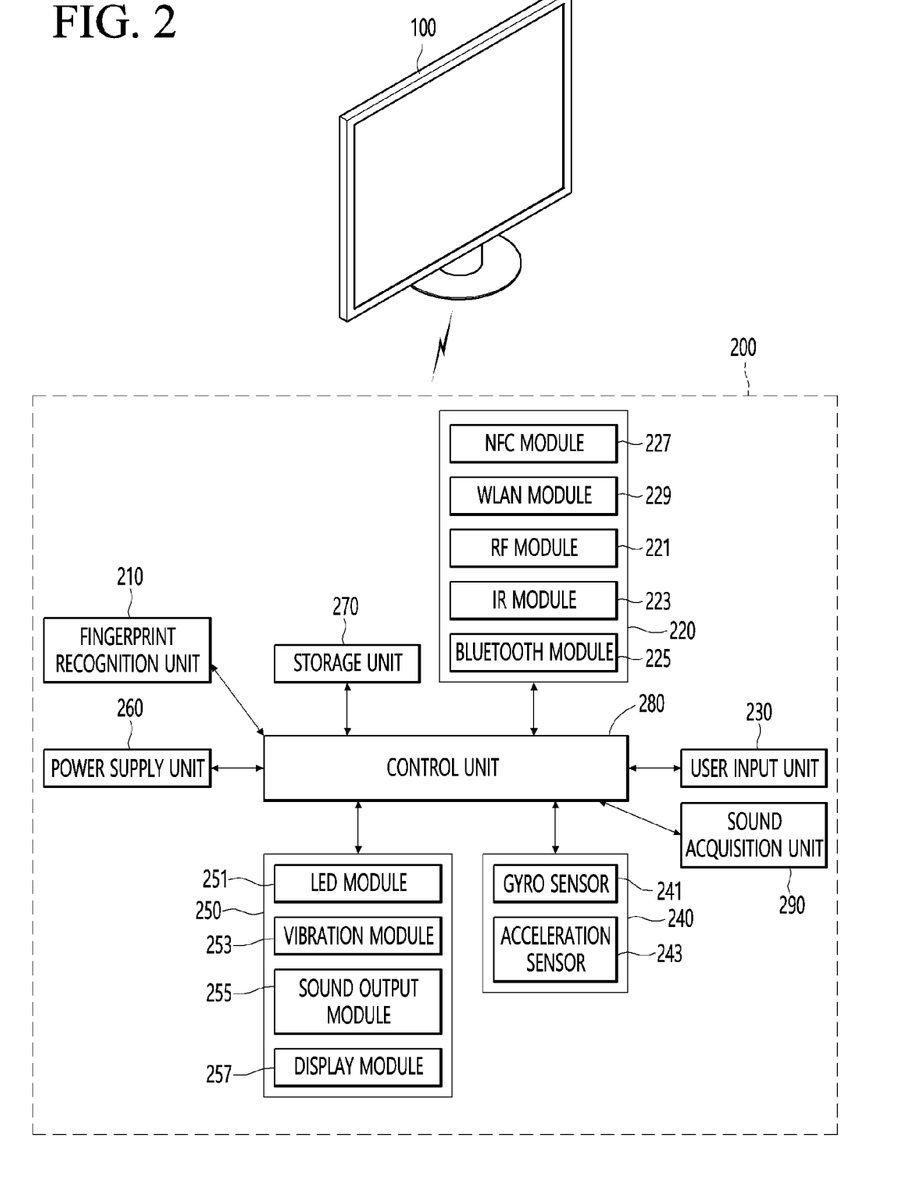
FIG. 2 is a block diagram illustrating a remote control device according to an embodiment of the present invention.
Figure 3:
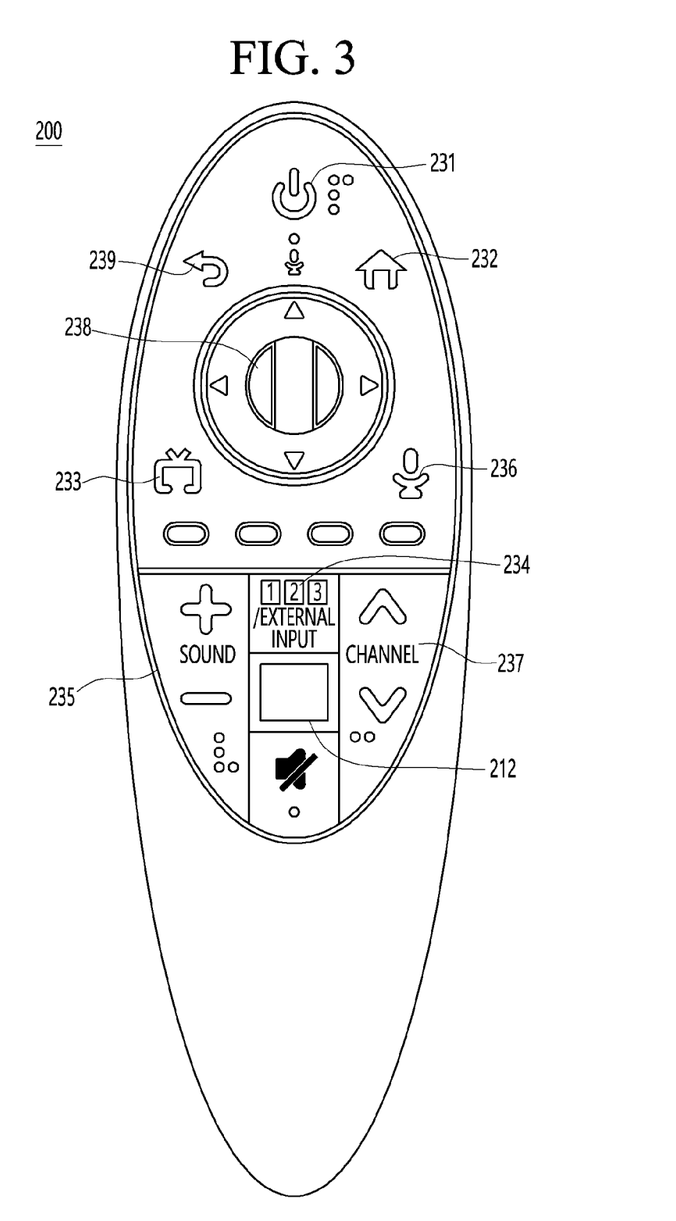
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present invention, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, explains FIG. 2.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present invention.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 230 or image or voice signals corresponding to signals transmitted from the display device 100. A user may recognize whether the user input unit 230 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to control of the remote control device 200. The control unit 280 may transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 may obtain voice.

The sound acquisition unit 290 may include at least one microphone and obtain voice through the microphone 291.

Next, FIG. 4 will be described.

Figure 4:
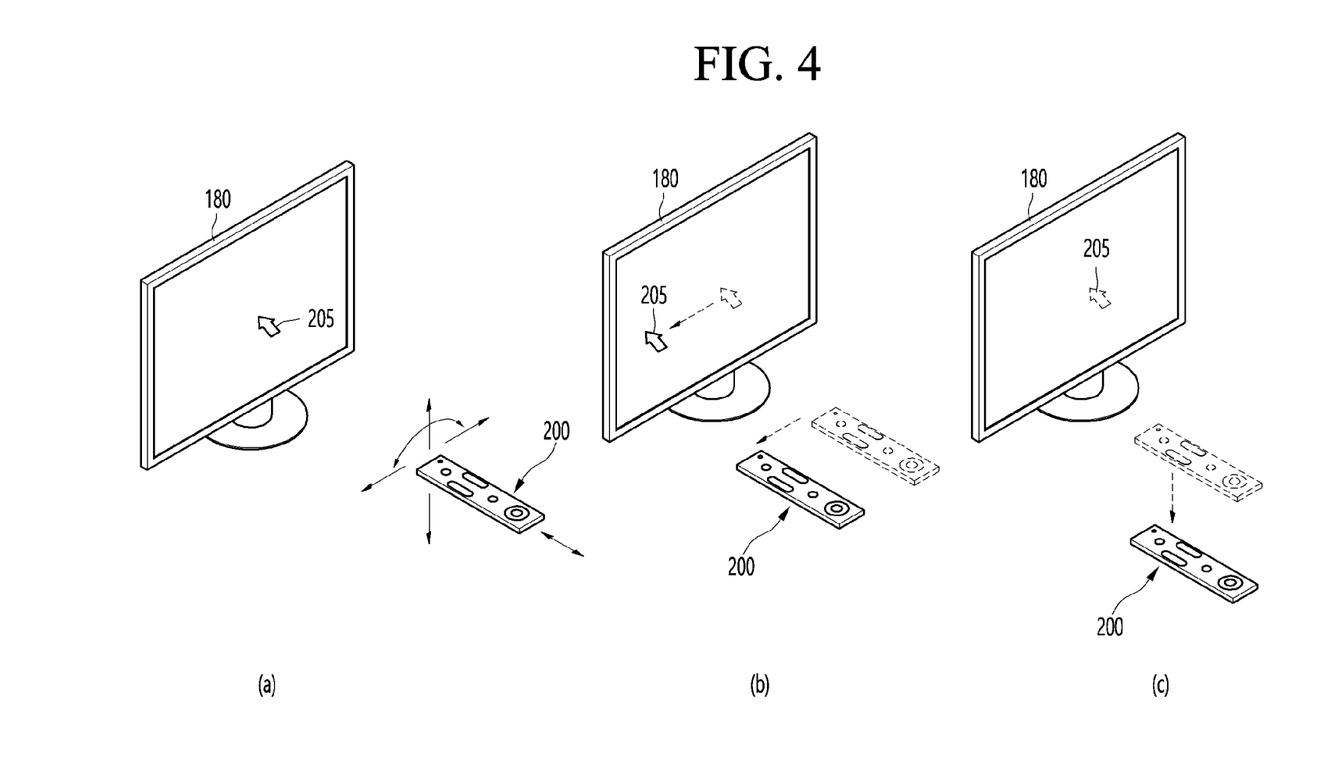
FIG. 4 is a view of utilizing a remote control device according to an embodiment of the present invention.

FIG. 4 is a view of utilizing a remote control device according to an embodiment of the present invention.

FIG. 4(a) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 may be zoomed in and displayed larger.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the display device 100 may provide functions such as Internet search, home shopping, and online game. For example, the display device 100 may provide various functions such as Internet search, home shopping, online game, etc. through application.

The display device 100 may display at least one input field on the display 180 when providing the various functions described above.

An input field may be a UI (User Interface) for inputting text. The input field may receive text such as character and number. The control unit 170 may select an input field through the pointer 203 or the like and then, when text is input, display the input text in the input field.

The control unit 170 may receive text to be input into the input field through a button provided on the remote control device 200. Alternatively, the control unit 170 may receive text to be input into the input field by recognizing the user's voice through the voice acquisition unit 175.

Meanwhile, conventionally, when the control unit 170 recognizes the user's voice, it converts the text word by word. Accordingly, the control unit 170 converts the input user voice into a similar word even though it does not correspond to a specific word. In particular, when a user speaks to input an ID, password, or email, there is a high possibility that the text will be converted into characters different from the user's intent. This is because most ID, password, or email are composed of non-linguistic letters, and these letters are transformed into characters recognized as word unit. For example, the user intent to input "icadot" as the ID, but the control unit 170 converts into word unit as "I see AT&T" or "I can do it", so there is problem occurring an error.

To minimize the occurrence of such error, the present disclosure seeks to perform speech recognition (STT: Speech-to-Text) in different way according to the input field.

First, with reference to FIG. 5, the input field will be described.

Figure 5:
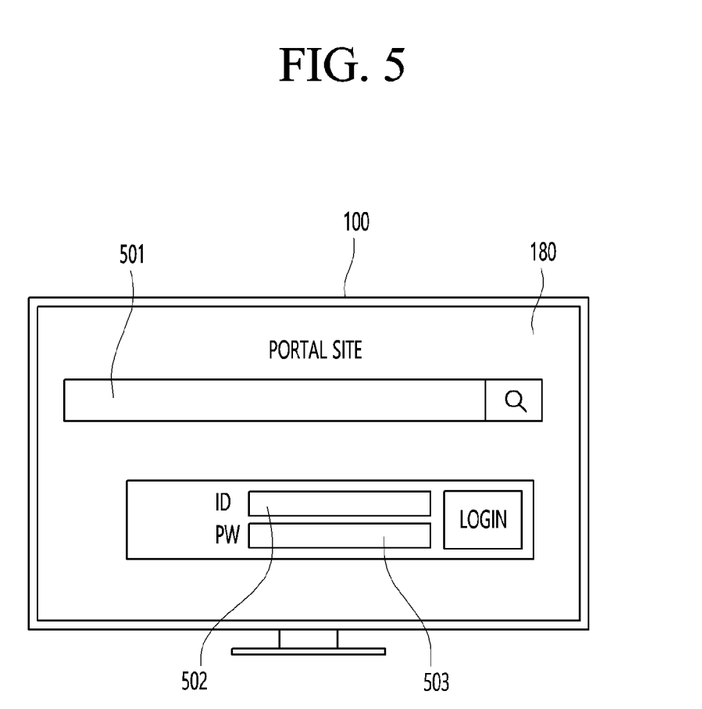
FIG. 5 is a diagram illustrating an example of a screen on which a display device displays at least one input field according to an embodiment of the present disclosure.

FIG. 5 is a diagram illustrating an example of a screen on which a display device displays at least one input field according to an embodiment of the present disclosure.

Display 180 may display at least one input field. For example, the control unit 170 may control the display 180 to display at least one input field 501, 502, or 503 when accessing a portal site, etc.

The input fields 501, 502, and 503 may include an input field 501 for entering a search term, an input field 502 for entering an ID, and an input field 503 for entering a password, but as this is only an example, it is reasonable that it is not limited thereto.

The control unit 170 according to an embodiment of the present disclosure may distinguish type of input field and perform speech-to-text conversion (STT) differently for each type of input field.

Figure 6:
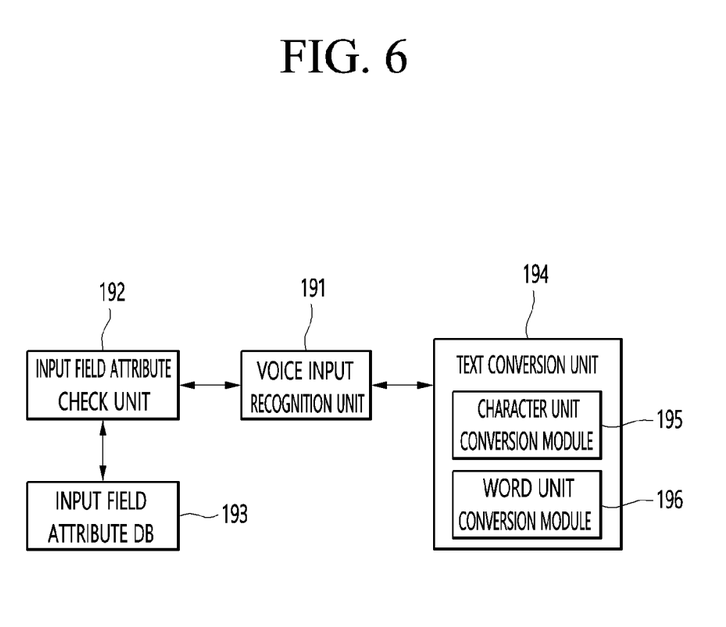
FIG. 6 is a control block diagram for explaining how a display device according to an embodiment of the present disclosure performs speech-to-text conversion differently according to the input field.
Figure 7:
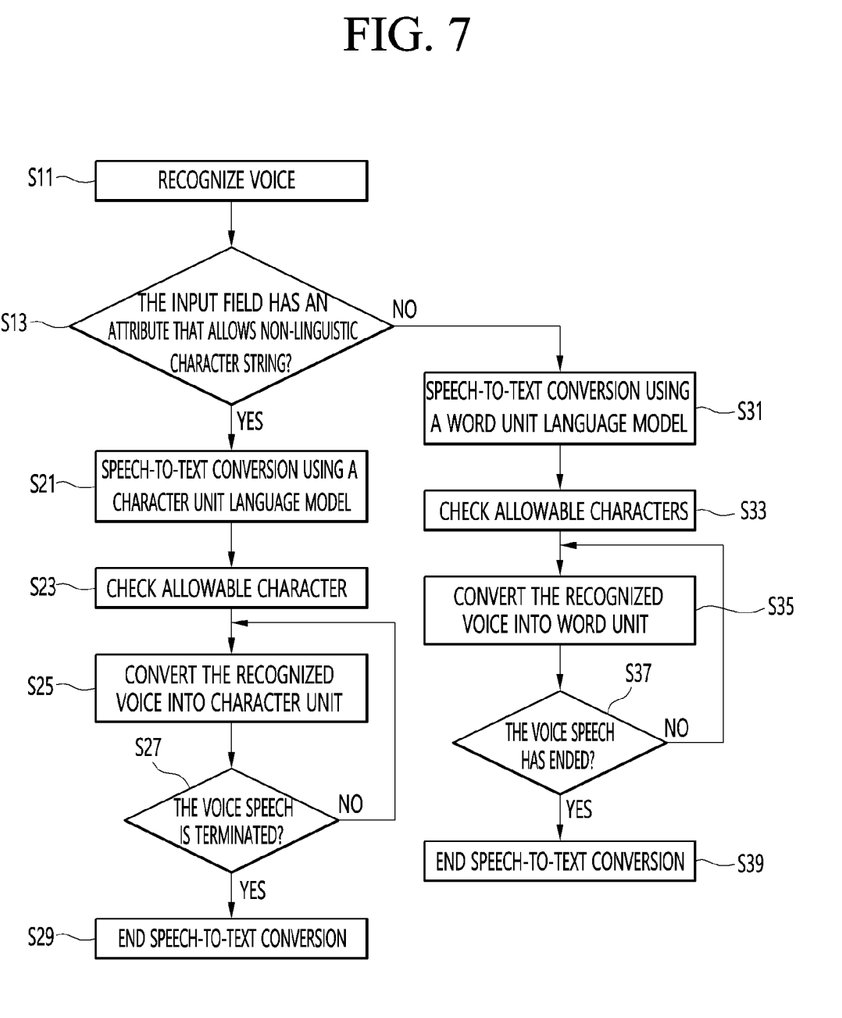
FIG. 7 is a flow chart illustrating a method in which a display device according to an embodiment of the present disclosure performs speech-to-text conversion differently according to the input field.

With reference to FIGS. 6 and 7, a method in which the display device 100 according to an embodiment of the present disclosure performs speech-to-text conversion differently according to the type of input field will be described in detail.

FIG. 6 is a control block diagram for explaining how a display device according to an embodiment of the present disclosure performs speech-to-text conversion differently according to the input field, and FIG. 7 is a flow chart illustrating a method in which a display device according to an embodiment of the present disclosure performs speech-to-text conversion differently according to the input field.

The display device 100 may include at least part or all of a voice input recognition unit 191, an input field attribute check unit 192, an input field attribute DB 193, or a text conversion unit 194.

The voice input recognition unit 191, the input field attribute check unit 192, the input field attribute DB 193, or the text conversion unit 194 may be a component of the control unit 170.

The voice input recognition unit 191 may recognize the user's voice. The voice input recognition unit 191 may be the voice acquisition unit 175 of FIG. 1. The voice acquisition unit 175 may acquire the voice input to the input field.

The input field attribute check unit 192 may check the attribute of the input field. In particular, the input field attribute check unit 192 may obtain the input type among the attributes of the input field and obtain the type of the input field based on the input type.

According to one embodiment, the control unit 170 may check the attribute of the input field to distinguish the type of input field. The control unit 170 may obtain the attribute of the input field and obtain the type of the input field based on the obtained attribute.

Specifically, the input type of the input field may be email, password, text, etc. The control unit 170 may preset an input type to be classified as a first type and an input type to be classified as a second type. For example, the control unit 170 may set email or password as an input type to be classified as a first type, and set text, etc. as an input type to be classified as a second type. The control unit 170 may obtain the input type of the input field in which voice recognition is performed/activated, and determine the input field as one of the first type or the second type based on the input type. For example, if the input type is email, the control unit 170 may determine the corresponding input field as the first type, and if the input type is text, the control unit 170 may determine the corresponding input field as the second type.

According to the embodiment, the storage unit 140 may store a table mapping the type of input field for each of a plurality of input types. This table may be stored in the input field attribute DB 193.

The input field attribute DB 193 may store data to distinguish the type of input field. The input field attribute DB 193 may store data for determining the input field as either the first type or the second type for each attribute of the input field. The input field attribute DB 193 may store data that determines whether the voice to be input will be converted into character unit or word unit according to the attribute of the input field. An example of such data may be the table described above.

The text conversion unit 194 may convert the voice input through the voice input recognition unit 191 into text. The character conversion unit 194 may include a character unit conversion module 195 and a word unit conversion module 196.

The character unit conversion module 195 may convert the input user voice into characters on a character unit basis. The character unit conversion module 195 may perform speech-to-text conversion using a character unit language model. For example, when the character unit conversion module 195 receives a user's voice input in English, it may perform character conversion on an alphabet basis.

The word unit conversion module 196 may convert the input user voice into text on a word-by-word basis. The word unit conversion module 196 may perform speech-to-text conversion using a word unit language model. As an example, the word unit conversion module 196 may convert the user's voice into text on a word-by-word basis.

Accordingly, the control unit 170 may perform speech-to-text conversion through the character unit conversion module 195 if the input field is the first type, and perform speech-to-text conversion through the word unit conversion module 196 when the input field is the second type.

That is, the control unit 170 converts voice into text, and may convert voice into text on a character unit or word unit according to the type of input field.

Next, with reference to FIG. 7, a method of performing different speech-to-text conversion (STT) according to the type of input field will be described in detail.

The control unit 170 may recognize voice (S11).

The control unit 170 may start voice recognition for a specific input field.

The control unit 170 may determine whether the input field has an attribute that allows non-linguistic character string (S13).

That is, the control unit 170 may analyze the attribute of the input field and obtain whether the attribute of the input field allowing non-linguistic character string. Here, a list of non-linguistic character string may mean a list of characters that have no linguistic meaning. If it is an input field that receives an ID, password, email, URL, etc., the control unit 170 may determine that the input field has an attribute that allowing non-linguistic character string.

Meanwhile, step S13 may be a step of determining the type of input field.

That is, according to the embodiment, in step S13, the control unit 170 may obtain the type of the input field. Specifically, the control unit 170 may obtain the type of the input field by determining the input field as either the first type or the second type based on the attribute of the input field.

In this specification, the first type of input field is an input field with an attribute that allows non-linguistic character string, and the second type of input field may refer to the remaining input fields excluding the first type.

If the input field has the attribute that allows non-linguistic character string, the control unit 170 may perform speech-to-text conversion using a character unit language model (S21).

That is, if the input field is a field that receives an ID, email address, or password, the control unit 170 may convert the voice into character unit/Alphabet unit. If the input field is the first type, the control unit 170 may convert the voice into text character by character.

The control unit 170 may check allowable character (S23) and convert the recognized voice into character unit (S25).

The control unit 170 may set allowable character (including space) differently according to the type of input field.

When the type of input field is the first type, the control unit 170 may only allow English alphabet, number, and preset special character (for example, @ used in email address). Accordingly, when the type of input field is the first type, the control unit 170 may display converted character in the input field using only alphabet, number, and preset special character.

Additionally, when the type of input field is the first type, the control unit 170 may display the converted characters as the recognized word in the input field when a word meaning a space is recognized. That is, when a word corresponding to "(for example, blank, space, etc.)" is recognized, the control unit 170 may display the word itself (e.g., blank, space, etc.) in the input field. That is, the control unit 170 may not space even if the word corresponding to "(for example, blank, space, etc.)" is recognized.

Additionally, the control unit 170 may not support spacing when the type of input field is the first type. Accordingly, when the type of input field is the first type, the control unit 170 may display the converted character in the input field without space.

The control unit 170 may obtain whether the voice speech is terminated (S27) and end speech-to-text conversion when the voice speech is terminated (S29).

Meanwhile, in step S13, if the control unit 170 determines that the input field does not have an attribute that allows non-linguistic character string, it may perform speech-to-text conversion using a word unit language model (S31).

For example, if the input field is a field that receives a search word, the control unit 170 may determine that it does not have an attribute that allows non-linguistic character string. As another example, the control unit 170 may determine that if the input field does not correspond to a field that receives an ID, email address, or password, it does not have the attribute that allows non-linguistic character string.

The control unit 170 may check allowable characters (S33) and convert the recognized voice into word unit (S35).

If the type of input field is the second type, the control unit 170 may perform text conversion into the language set as default. That is, when the type of input field is the second type, the control unit 170 may display characters converted to the language set as default in the input field. That is, when the type of input field is the second type, the control unit 170 is not limited to English and may perform text conversion to the set language.

When the type of input field is the second type, the control unit 170 may perform character conversion on a word-by-word basis and perform spacing for each of words.

Meanwhile, even when the type of input field is the second type, non-linguistic character string may be required. Accordingly, when the type of input field is the second type, the control unit 170 may provide an input mode switching function that converts voice into character unit for input of non-linguistic character string. If the type of input field is the second type, the control unit 170 may display an icon (not shown) for switching the input mode. If the type of input field is the second type, the control unit 170 may convert the voice into character unit through an input mode switching function, and in this case, spacing may not be supported.

The control unit 170 obtains whether the voice speech has ended (S37), and may end speech-to-text conversion when the voice speech has ended (S39).

According to the above-described method, if the input voice is "icadot", the control unit 170 may display "icadot" on the input field if the input field is of the first type, and display "I see AT&T", "I can do it" or "Ica dot", etc if the input field is of the second type on the input field.

In addition, when the default setting language is a language other than English, such as Korean or French, even if the input voice is the same, if the input field is the first type, the control unit 170 may display the text converted to English in the input field, and display the text converted to English in the input field. If is the second type, characters converted to the default setting language may be displayed in the input field.

The present disclosure described above may be implemented as computer-readable code on a program-recorded medium. Computer-readable media includes all types of recording devices that store data that may be read by a computer system. Examples of computer-readable media include HDD (Hard Disk Drive), SSD (Solid State Disk), SDD (Silicon Disk Drive), ROM, RAM, CD-ROM, magnetic tape, floppy disk, optical data storage device, etc. Additionally, the computer may include a processor 329 of the sound reproduction device 300. Accordingly, the above detailed description should not be construed as restrictive in all respects and should be considered illustrative. The scope of this specification should be determined by reasonable interpretation of the appended claims, and all changes within the equivalent scope of this specification are included in the scope of this specification.

The above description is merely an illustrative explanation of the technical idea of the present invention, and various modifications and variations will be possible to those skilled in the art without departing from the essential characteristics of the present invention.

Accordingly, the embodiments disclosed in the present invention are not intended to limit the technical idea of the present invention, but rather to explain it, and the scope of the technical idea of the present invention is not limited by these embodiments.

The scope of protection of the present invention should be interpreted in accordance with the claims below, and all technical ideas within the equivalent scope should be construed as being included in the scope of rights of the present invention.

What is claimed is:

1. A display device, comprising:
    a display configured to display at least one input field;
    a voice acquisition unit configured to acquire a voice input to the input field; and
    a control unit configured to convert the voice into text, wherein the control unit is further configured to:
    obtain an attribute of the input field,
    determine a first type or a second type of the input field based on the obtained attribute,
    wherein the first type of the input field is the input field with an attribute that allows a non-linguistic character string, and the second type of the input field is the input field with an attribute that does not allow the non-linguistic character string, and
    convert the voice into text on a character unit when the type of the input field is determined the first type, or convert the voice into word unit when the type of the input field is determined the second type.

2. The display device of claim 1, wherein the control unit is configured to:
    convert the voice into character unit if the input field is a field that receives an ID, email address, or password, and
    convert the voice into word unit if the input field is a field that receives a search word.

3. The display device of claim 1, wherein the control unit is further configured to:
    display the converted text in the input field without spacing, if the type of the input field is the first type.

4. The display device of claim 1, wherein the control unit is further configured to:
    if the type of the input field is the first type, when a word meaning a space is recognized, display the converted text as the recognized word in the input field.

5. The display device of claim 1, wherein the control unit is further configured to:
    display the converted text in the input field using only alphabet, number, and preset special character if the type of the input field is the first type.

6. The display device of claim 1, wherein the control unit is further configured to:
    display the converted text to a language set as default in the input field if the type of the input field is the second type.

7. The display device of claim 1, wherein the control unit is further configured to:
    convert the voice into the character unit through an input mode switching function for converting the voice into text on the character unit if the type of input field is the second type.

8. The display device of claim 7, wherein the control unit is further configured to:
    display an icon for switching the input mode if the type of the input field is the second type.

9. An operating method of a display device, comprising:
displaying at least one input field;
obtaining a voice input to the input field; and
obtaining an attribute of the input field,
determining a first type or a second type of the input field based on the obtained attribute,
wherein the first type of the input field is the input field with an attribute that allows a non-linguistic character string, and the second type of the input field is the input field with an attribute that does not allow the non-linguistic character string, and
converting the voice into text,
wherein the step of converting the voice into text comprises:
obtaining a type of the input field, and
converting the voice into the text on a character unit when the type of the input field is determined the first type, or convert the voice into a word unit when the type of the input field is determined the second type.

* * * * *